US006950513B2

(12) United States Patent
Hirai et al.

(10) Patent No.: US 6,950,513 B2
(45) Date of Patent: Sep. 27, 2005

(54) IMPULSE RESPONSE SETTING METHOD FOR THE 2-CHANNEL ECHO CANCELING FILTER, A TWO-CHANNEL ECHO CANCELLER, AND A TWO-WAY 2-CHANNEL VOICE TRANSMISSION DEVICE

(75) Inventors: Toru Hirai, Hamamatsu (JP); Yoshikazu Honji, Hamamatsu (JP); Mikio Tohyama, Tokyo-to (JP); Aya Togura, Ichihara (JP)

(73) Assignee: Yamaha Corporation, Hamamatsu (JP)

( * ) Notice: Subject to any disclaimer, the term of this patent is extended or adjusted under 35 U.S.C. 154(b) by 493 days.

(21) Appl. No.: 10/141,276

(22) Filed: May 8, 2002

(65) Prior Publication Data

US 2003/0021389 A1 Jan. 30, 2003

(30) Foreign Application Priority Data

May 9, 2001 (JP) .................................... P2001-138304

(51) Int. Cl.[7] .......................... H04M 1/00; H04M 9/00; H04M 9/08

(52) U.S. Cl. .............................. 379/406.11; 379/406.01

(58) Field of Search ......... 381/66; 379/406.01–406.16; 370/286; 455/570

(56) References Cited

U.S. PATENT DOCUMENTS 5,828,756 A 10/1998 Benesty et al.
5,987,143 A * 11/1999 Okuno et al. ................. 381/66
6,563,880 B1 * 5/2003 Hunsinger et al. .......... 375/260

FOREIGN PATENT DOCUMENTS

JP 10-093680 4/1998
JP 10-190848 7/1998

OTHER PUBLICATIONS

Murtaza Ali, "Stereophonic Acoustic Echo Cancellation System using Time Varying All–Pass Filtering for Signal Decorrelation". Acoustics, Speech, and Signal Processing, 1998. ICASSP '98.pp.: 3689–3692 vol. 6.*

* cited by examiner

*Primary Examiner*—Curtis Kuntz
*Assistant Examiner*—Alexander Jamal
(74) *Attorney, Agent, or Firm*—Pillsbury Winthrop Shaw Pittman LLP

(57) ABSTRACT

Two signals, which are mutually correlated, are subjected to a principal component analysis and converted into two signals being put in an orthogonal relation, thereby generating two signals being non-correlated. Those two signals are reproduced by speakers, and the voice generated from the speakers are collected by microphones. The cross spectra of a signal as the result of subtracting an echo canceling signal from a voice collected by each microphone, and a voice before it is generated from the speaker, are obtained. Those cross spectra are ensemble-averaged for a predetermined period of time, and inverse Fourier transformed, thereby producing impulse response estimation errors of each filter. Impulse responses of those filters are updated so as to cancel those impulse response estimation errors.

13 Claims, 7 Drawing Sheets

IMPULSE RESPONSE SETTING METHOD FOR THE 2-CHANNEL ECHO CANCELING FILTER, A TWO-CHANNEL ECHO CANCELLER, AND A TWO-WAY 2-CHANNEL VOICE TRANSMISSION DEVICE

BACKGROUND OF THE INVENTION

The present invention relates to an impulse response setting method for the 2-channel echo canceling filter, a two-channel echo canceller, and a two-way 2-channel voice transmission device. More particularly, this invention relates to solve the coefficient indefiniteness problem in the 2-channel echo canceling process.

In the two-way 2-channel audio transmission used for the videoconference system or the like, a coefficient indefiniteness in the echo canceller has been pointed out. Various solutions to the problem have been proposed (The Journal of the Institute of Electronics, Information and Communication Engineers, Vol. 81, No. 3 P. 26 to 274 1998, March). One of the solutions is to reduce an interchannel correlation. Techniques to reduce the interchannel correlation are, for example, addition of random noise, elimination of correlation by the filter, interchannel frequency shift, use of interleave comb filter, and nonlinear processing (Japanese patent laid-open No. 190848/1998). Another solution is to utilize the fact that the interchannel correlation function delicately varies by a spatial movement of a sound source in an actual acoustic field (Japanese patent laid-open No. 93680/1998).

SUMMARY OF THE INVENTION

An object of the present invention is to provide an impulse response setting method for the 2-channel echo canceling filter, a two-channel echo canceller, a two-way 2-channel voice transmission device, which are made free from the coefficient indefiniteness problem by using a method which orthogonalizes two signals to be reproduced and non-correlates the resultant signals, and estimates an acoustic system in a predetermined space on the basis of the cross spectra of the non-correlated signals and an error signal.

In order to solve the aforesaid object, the invention is characterized by having the following arrangement.

(1) A method of setting impulse responses of first, second third and fourth filters for echo canceling, the method comprising the steps of:

generating first and second echo cancel signals by convoluting a first impulse response of the first filter provided corresponding to a first microphone and a second impulse response of the second filter provided corresponding to a second microphone, respectively, to a first sound signal supplied to a first speaker;

generating third and fourth echo cancel signals by convoluting a third impulse response of the third filter provided corresponding to the first microphone and a fourth impulse response of the fourth filter provided to the second microphone, respectively, to a second sound signal supplied to a second speaker;

generating a first differential signal by subtracting the first and third echo cancel signals from a first collected signal collected by the first microphone;

generating a second differential signal by subtracting the second and fourth echo cancel signal from a second collected signal collected by the second microphone;

performing a principal component analysis on first and second correlation signals mutually correlated to convert the first correlation signal to a first orthogonal signal and convert the second correlation signal to a second orthogonal signal which is orthogonal to the first orthogonal signal;

reproducing the first orthogonal signal through the first speaker and reproducing the second orthogonal signal through the second speaker;

calculating a first cross spectrum between the first differential signal and the first orthogonal signal to be reproduced by the first speaker, calculating an estimation error of the first impulse response based on the first cross spectrum, and updating characteristics of the first impulse response so as to cancel the estimation error of the first impulse response;

calculating a third cross spectrum between the first differential signal and the second orthogonal signal to be reproduced by the second speaker, calculating an estimation error of the third impulse response based on the third cross spectrum, and updating characteristics of the third impulse response to cancel the estimation error of the third impulse response;

calculating a second cross spectrum between the second differential signal and the first orthogonal signal to be reproduced by the first speaker, calculating an estimation error of the second impulse response based on the second cross spectrum, and updating characteristics of the second impulse response to cancel the estimation error of the second impulse response;

calculating a fourth cross spectrum between the second differential signal and the second orthogonal signal to be reproduced by the second speaker, calculating an estimation error of the fourth impulse response based on the fourth cross spectrum, and updating characteristics of the fourth impulse response to cancel the estimation error of the fourth impulse response.

(2) The method according to (1) further comprising the steps of:

switching the first orthogonal signal to be reproduced by the first speaker to the first correlation signal and switching the second orthogonal signal to be reproduced by the second speaker to the second correlation signal after updating the characteristics of the first and fourth impulse responses.

(3) The method according to (2), wherein the estimation error of the first, second, third and fourth impulse responses are calculated during the first speaker reproduces the first correlation signal and the second speaker reproduces the second correlation signal.

(4) The method according to (3) further comprising the steps of:

detecting whether the estimation error of at least one of the first, second, third and fourth filters reaches a predetermined value, wherein when the estimation error of the at least one reaches the predetermined value, the first correlation signal to be reproduced by the first speaker is switched to the first orthogonal signal and the second correlation signal to be reproduced by the second speaker is switched to the second orthogonal signal, and the characteristics of the at least one is updated.

(5) A method of setting impulse responses of first, second third and fourth filters for echo canceling when sound signals are bi-directionally transmitted between first and second points, wherein first and second speakers and first and second microphones are provided at the first place, and third and fourth speakers, third and fourth microphones, the first and third filters corresponding to the third microphone and the second and fourth filters corresponding to the fourth microphone are provided at the second point, the method comprising the steps of:

generating first and second echo cancel signals by convoluting a first impulse response of the first filter and a second impulse response of the second filter, respectively, to a first sound signal collected by the first microphone and supplied to the third speaker;

generating third and fourth echo cancel signals by convoluting a third impulse response of the third filter and a fourth impulse response of the fourth filter, respectively, to a second sound signal collected by the second microphone and supplied to the fourth speaker;

supplying to the first speaker a first differential signal obtained by subtracting the first and third echo cancel signals from a first collected signal collected by the third microphone;

supplying to the second speaker a second differential signal obtained by subtracting the second and fourth echo cancel signals from a second collected signal by the fourth microphone;

performing a principal component analysis on a first and second correlation signals mutually correlated to convert the first correlation signal to a first orthogonal signal and convert the second correlation signal to a second orthogonal signal which is orthogonal to the first orthogonal signal;

reproducing the first orthogonal signal through the third speaker and reproducing the second orthogonal signal through the fourth speaker;

calculating a first cross spectrum between the first differential signal and the first orthogonal signal to be produced by the third speaker, calculating an estimation error of the first impulse response based on the first cross spectrum, and updating characteristics of the first impulse response so as to cancel the estimation error of the first impulse response;

calculating a third cross spectrum between the first differential signal and the second orthogonal signal to be produced by the fourth speaker, calculating an estimation error of the third impulse response based on the third cross spectrum, and updating characteristics of the third impulse response so as to cancel the estimation error of the third impulse response;

calculating a second cross spectrum between the second differential signal and the first orthogonal signal to be produced by the third speaker, calculating an estimation error of the second impulse response based on the second cross spectrum, and updating characteristics of the second impulse response so as to cancel the estimation error of the second impulse response;

calculating a fourth cross spectrum between the second differential signal and the second orthogonal signal to be produced by the fourth speaker, calculating an estimation error of the fourth impulse response based on the fourth cross spectrum, and updating characteristics of the fourth impulse response so as to cancel the estimation error of the fourth impulse response.

(6) The method according to (5) further comprising the steps of:

switching the first orthogonal signal to be reproduced by the third speaker to the first correlation signal and switching the second orthogonal signal to be reproduced by the fourth speaker to the second correlation signal after updating the characteristics of the first and fourth impulse responses.

(7) The method according to (6), wherein the estimation error of the first, second, third and fourth impulse responses are calculated during the first speaker reproduces the first correlation signal and the second speaker reproduces the second correlation signal.

(8) The method according to (7) further comprising the steps of:

detecting whether the estimation error of at least one of the first, second, third and fourth filters reaches a predetermined value, wherein when the estimation error of the at least one reaches the predetermined value, the first correlation signal to be reproduced by the third speaker is switched to the first orthogonal signal and the second correlation signal to be reproduced by the fourth speaker is switched to the second orthogonal signal, and the characteristics of the at least one is updated.

(9) An echo canceller for performing an echo canceling operation in a manner that in an acoustic system in which first and second speakers and first and second microphones are disposed in a same space, the echo canceller comprising:

a first filter, for generating a first echo cancel signal by convoluting a first impulse response to a first sound signal supplied to the first speaker, provided corresponding to the first microphone;

a second filter, for generating a second echo cancel signal by convoluting a second impulse response to the first sound signal, provided corresponding to the second microphone;

a third filter, for generating a third echo cancel signal by convoluting a third impulse response to a second sound signal supplied to the second speaker, provided corresponding to the first microphone;

a fourth filter, for generating a fourth echo cancel signal by convoluting a fourth impulse response to the second sound signal, provided corresponding to the first microphone;

a first subtracter for generating a first differential signal obtained by subtracting the first and third echo cancel signals from a first collected sound signal collected by the first microphone;

a second subtracter for generating a second differential signal obtained by subtracting the second and fourth echo cancel signals from a second collected sound signal collected by the second microphone; and a orthogonalizing unit for performing a principal component analysis on first and second correlation signals mutually correlated to convert the first correlation signal to a first orthogonal signal and convert the second correlation signal to a second orthogonal signal which is orthogonal to the first orthogonal signal, the first orthogonal signal being reproduced through the first speaker and the second orthogonal signal being reproduced through the second speaker, wherein the first filter calculates a first cross spectrum between the first differential signal and the first orthogonal signal to be reproduced by the first speaker, calculates an estimation error of the first impulse response based on the first cross spectrum, and updates characteristics of the first impulse response so as to cancel the estimation error of the first impulse response, wherein the third filter calculates a third cross spectrum between the first differential signal and the second orthogonal signal to be reproduced by the second speaker, calculates an estimation error of the third impulse response based on the third cross spectrum, and updates characteristics of the third impulse response to cancel the estimation error of the third impulse response, wherein the second filter calculates a second cross spectrum between the second differential signal and the first orthogonal signal to be reproduced by the first speaker, calculating an estimation error of the second impulse response based on the second cross spectrum, and updating characteristics of the second impulse response to cancel the estimation error of the second impulse response, and wherein the fourth filter calculates a fourth cross spectrum between the second differential signal and the second orthogonal signal to be reproduced by the second speaker, calculating an estimation error of the fourth impulse response based on the fourth cross spectrum, and updating characteristics of the fourth impulse response to cancel the estimation error of the fourth impulse response.

(10) An echo canceller, wherein when the sound signals are bi-directionally transmitted between a first point on which first and second speakers and first and second microphone are disposed and a second point on which third and fourth speakers and third and fourth microphones are disposed, the echo canceller is used in the second point, the echo canceller comprising:

a first filter, for generating a first echo cancel signal by convoluting a first impulse response to a first sound signal collected by the first microphone and supplied to the third speaker, provided corresponding to the third microphone;

a second filter, for generating a second echo cancel signal by convoluting a second impulse response to the first sound signal, provided corresponding to the fourth microphone;

a third filter, for generating a third echo cancel signal by convoluting a third impulse response to a second sound signal collected by the second microphone and supplied to the fourth speaker, provided corresponding to the third microphone;

a fourth filter, for generating a fourth echo cancel signal by convoluting a fourth impulse response of the fourth filter to the second sound signal, provided corresponding to the fourth microphone;

a first subtracter for generating a first differential signal obtained by subtracting obtained by subtracting the first and third echo cancel signals from a first collected signal collected by the third microphone;

a second subtracter for generating a second differential signal obtained by subtracting the second and fourth echo cancel signals from a second collected signal by the fourth microphone; and a orthogonalizing unit for performing a principal component analysis on a first and second correlation signals mutually correlated to convert the first correlation signal to a first orthogonal signal and convert the second correlation signal to a second orthogonal signal which is orthogonal to the first orthogonal signal, the first orthogonal signal being reproduced through the third speaker and the second orthogonal signal being reproduced through the fourth speaker, wherein the first filter calculates a first cross spectrum between the first differential signal and the first orthogonal signal to be produced by the third speaker, calculates an estimation error of the first impulse based on the first cross spectrum, and updates characteristics of the first impulse response so as to cancel the estimation error of the first impulse response, wherein the third filter calculates a third cross spectrum between the first differential signal and the second orthogonal signal to be produced by the fourth speaker, calculates an estimation error of the third impulse based on the third cross spectrum, and updates characteristics of the third impulse response so as to cancel the estimation error of the third impulse response, wherein the second filter calculates a second cross spectrum between the second differential signal and the first orthogonal signal to be produced by the third speaker, calculates an estimation error of the second impulse based on the second cross spectrum, and updates characteristics of the second impulse response so as to cancel the estimation error of the second impulse response, wherein the fourth filter calculates a fourth cross spectrum between the second differential signal and the second orthogonal signal to be produced by the fourth speaker, calculates an estimation error of the fourth impulse response based on the fourth cross spectrum, and updates characteristics of the fourth impulse response so as to cancel the estimation error of the fourth impulse response.

(11) An echo canceller, wherein when the sound signals are bi-directionally transmitted between a first point on which first and second speakers and first and second microphone are disposed and a second point on which third and fourth speakers and third and fourth microphones are disposed, the echo canceller is used in the second point, the echo canceller comprising:

a first filter, for generating a first echo cancel signal by convoluting a first impulse response to a first sound signal collected by the first microphone and supplied to the third speaker, provided corresponding to the third microphone;

a second filter, for generating a second echo cancel signal by convoluting a second impulse response to the first sound signal, provided corresponding to the fourth microphone;

a third filter, for generating a third echo cancel signal by convoluting a third impulse response to a second sound signal collected by the second microphone and supplied to the fourth speaker, provided corresponding to the third microphone;

a fourth filter, for generating a fourth echo cancel signal by convoluting a fourth impulse response of the fourth filter to the second sound signal, provided corresponding to the fourth microphone;

a first subtracter for generating a first differential signal obtained by subtracting the first and third echo cancel signals from a first collected signal collected by the third microphone;

a second subtracter for generating a second differential signal obtained by subtracting the second and fourth echo cancel signals from a second collected signal by the fourth microphone; and a receiving unit for receiving first and second orthogonal signals which are orthogonal each other, the first orthogonal signal being reproduced through the third speaker and the second orthogonal signal being reproduced through the fourth speaker, wherein the first orthogonal signal is converted from a first correlation signal by performing a principal component analysis on the first correlation signal, the second orthogonal signal is converted from a second correlation signal correlated to the first correlation signal by performing a principal component analysis on the second correlation signal, wherein the first filter calculates a first cross spectrum between the first differential signal and the first orthogonal signal to be produced by the third speaker, calculates an estimation error of the first impulse response based on the first cross spectrum, and updates characteristics of the first impulse response so as to cancel the estimation error of the first impulse response, wherein the third filter calculates a third cross spectrum between the first differential signal and the second orthogonal signal to be produced by the fourth speaker, calculates an estimation error of the third impulse response based on the third cross spectrum, and updates characteristics of the third impulse response so as to cancel the estimation error of the third impulse response, wherein the second filter calculates a second cross spectrum between the second differential signal and the first orthogonal signal to be produced by the third speaker, calculates an estimation error of the second impulse response based on the second cross spectrum, and updates characteristics of the second impulse response so as to cancel the estimation error of the second impulse response, wherein the fourth filter calculates a fourth cross spectrum between the second differential signal and the second orthogonal signal to be produced by the fourth speaker, calculates an estimation error of the fourth impulse response based on the fourth cross spectrum, and updates characteristics of the fourth impulse response so as to cancel the estimation error of the fourth impulse response.

(12) A echo canceller for canceling an echo of a collected sound signal collected by a microphone comprising:

a filter unit for generating an echo cancel signal by convoluting an impulse response to an inputted sound signal;

a conversion unit for converting two correlation signals correlated each other to two orthogonal signals which are orthogonal to each other by performing a principal component analysis on the correlation signals; and a subtracting unit for outputting a differential signal obtained by subtracting the echo cancel signal from the collected sound signal, wherein the filter updates characteristics of the impulse response to cancel an estimation error of the impulse response calculated based on the differential signal and one of the orthogonal signals.

(13) The echo canceller according to (12), wherein the estimation error is calculated by the filter unit.

(14) The echo canceller according to (12), wherein the estimation error is calculated by an operation portion provided in the stereo echo canceller.

(15) A method of canceling an echo of a collected sound signal collected by a microphone comprising:

generating an echo cancel signal by convoluting an impulse response to an inputted sound signal;

performing a principal component analysis on two correlation signals correlated each other to convert the correlation signals to two orthogonal signals which are orthogonal to each other;

subtracting the echo cancel signal from the collected sound signal to obtain a differential signal;

outputting the differential signal;

calculating an estimation error based on the differential signal and one of the two orthogonal signals; and updating characteristics of the impulse response to cancel the calculated estimation error.

DESCRIPTION OF THE PREFERRED EMBODIMENT

Figure 2:
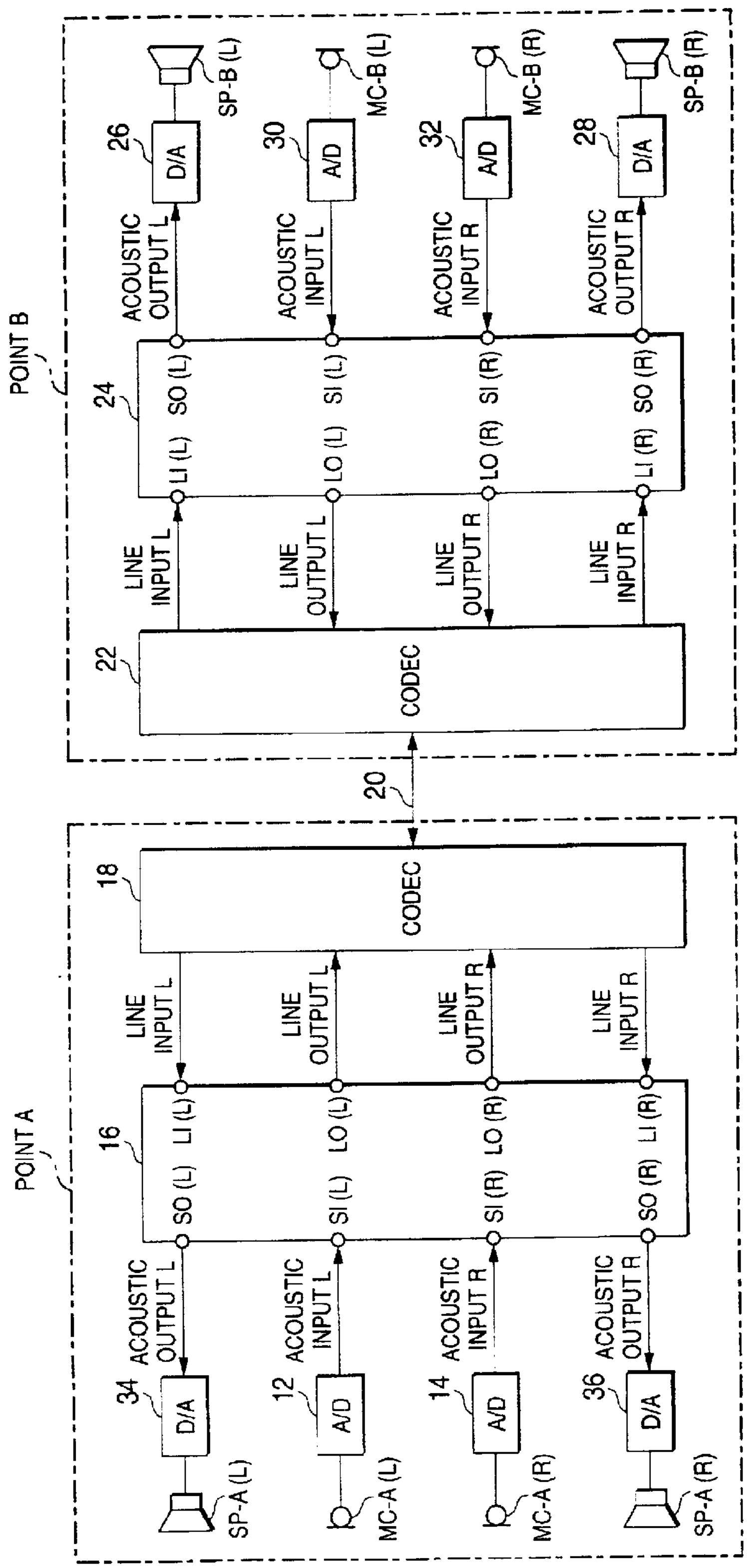
FIG. 2 is a block diagram showing an embodiment of a two-way stereo voice transmission device according to the invention.

The preferred embodiment of the present invention will be described with reference to the accompanying drawings. FIG. 2 is a block diagram showing an overall arrangement of a two-way stereo voice transmission device constructed according to the invention. The device performs a two-way stereo voice transmission between points (or sites) A and B, and may be applied to a videoconference system. Two speakers SP-A(R) and SP-A(L), and two microphones MC-A(R) and MC-A(L) are disposed in the same space at the point A. The signals (sound signals) collected by the microphones MC-A(R) and MC-A(L) are respectively converted to digital signals by A/D converters 12 and 14. Those converted signals are echo-cancelled by a stereo echo canceller 16, and then are modulated by a CODEC (including CODER and DECODER) 18 and transmitted through a wire or wireless transmission path 20 to the point B. At the point B, two speakers SP-B(R) and SP-B(L), and two microphones MC-B(R) and MC-B(L) are disposed in the same space. The signals transmitted from the point A are input to a CODEC 22 which in turn demodulates the signals collected by the microphones MC-A(R) and MC-A(L). The demodulated signals collected by the microphones MC-A (R) and MC-A(L) are applied through the stereo echo canceller 24 to D/A converters 26 and 28. Then, those converters convert those signals to analog signals, and the signals are reproduced by the speakers SP-B(R) and SP-B (L). The signals collected by the microphones MC-B(L) and MC-B(R) at the point B are respectively converted to digital signals by A/D converters 30 and 32. Those digital signals are subjected to an echo canceling process by the stereo echo canceller 24, and are modulated by the CODEC 22 and transmitted through the transmission path 20 to the point A. The signals arriving at the point A are input to the CODEC 18 and are demodulated into the signals collected by the microphones MC-B(R) and MC-B(L). Those demodulated signals collected by the microphones MC-B(R) and MC-B (L) are transmitted through the canceller 16 to the D/A converters 34 and 36, and converted to analog signals by the D/A converters, and are reproduced by the speakers SP-A(R) and SP-A(L).

Figure 1:
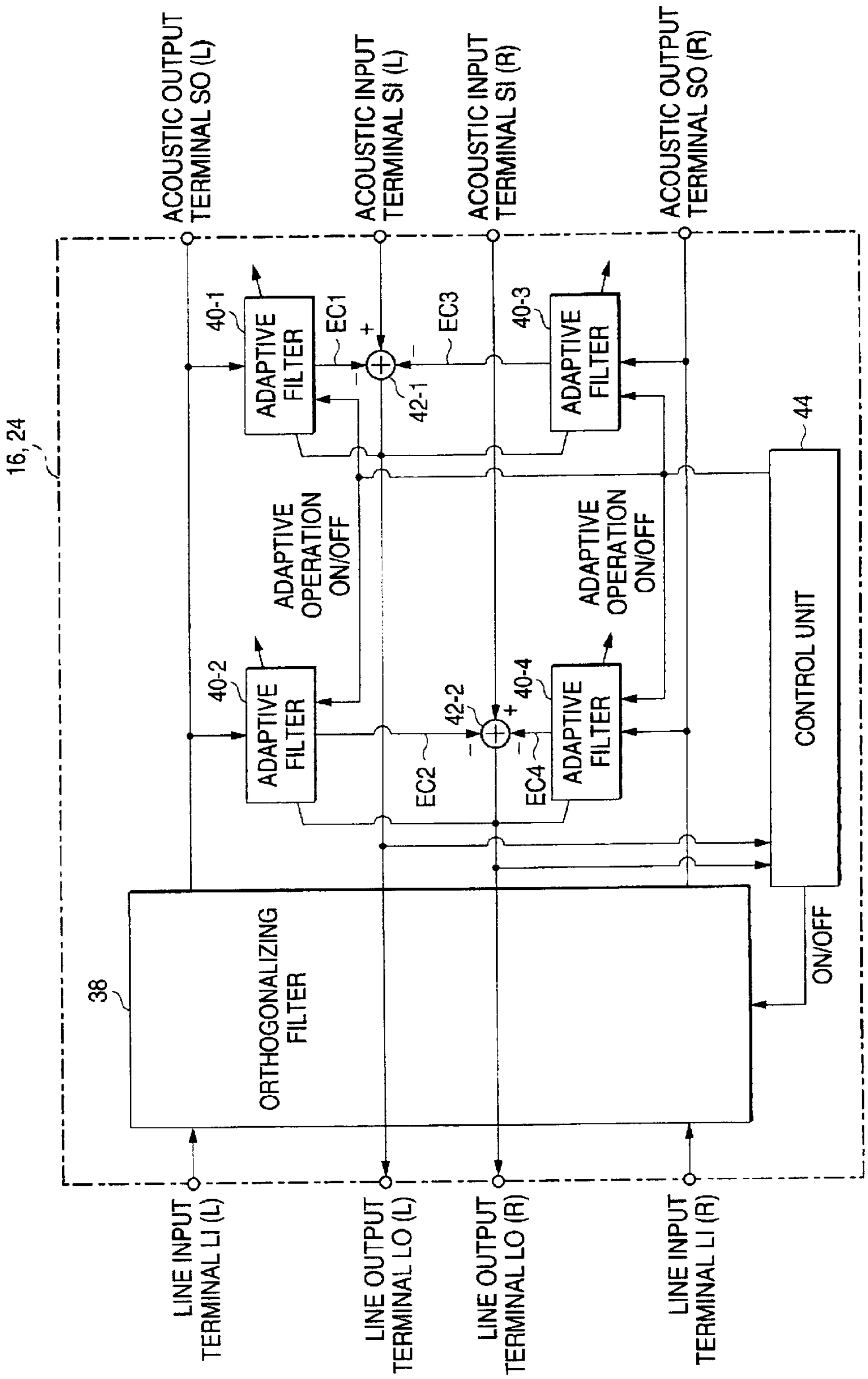
FIG. 1 is a block diagram showing an internal configuration of each of stereo echo cancellers 16 and 24 shown in FIG. 2.

FIG. 1 is a block diagram showing an internal configuration of each of stereo echo canceller 16 (24). An orthogonalizing filter 38 performs, for every predetermined period of time, a principal component analysis of right and left two-channel stereo signals which are inputted in line input terminals LI(R) and LI(L) from the point of the opposite party, through the transmission path 20 and the CODEC 18 (22), whereby those signals are converted into two signals being orthogonal to each other, and the converted signals are outputted from acoustic output terminals SO(R) and SO(L). The resultant two signals are respectively reproduced by the speaker SP(L) {SP-A(L) or SP-B(L)} and the speaker SP(R) ((SP-A(R) or SP-B(R)).

An adaptive filter 40-1 is configure as follows. An impulse response corresponding to a transfer function between the speaker SP(L) and the microphone MC(L) {(MC-A(L) or MC-B(L)} is set in the adaptive filter 40-1. The adaptive filter convolutes the impulse response to the signal derived from the acoustic output terminal SO(L). As a result, the signal derived from the acoustic output terminal SO(L) is reproduced by the speaker SP(L), the reproduced signal is collected by the microphone MC(L), whereby an echo cancel signal EC for canceling the signal to be input to an acoustic input terminal SI(L) is generated. An adaptive filter 40-2 is configured as follows. An impulse response corresponding to a transfer function between the speaker SP(L) and the microphone MC(R) {(MC-A(R) or MC-B(R)} is set in the adaptive filter 40-2. The adaptive filter convolutes the impulse response to the signal derived from the acoustic output terminal SO(L). As a result, the signal derived from the acoustic output terminal SO(L) is reproduced by the speaker SP(L), the reproduced signal is collected by the microphone MC(R), whereby an echo cancel signal EC2 for canceling the signal to be input to an acoustic input terminal SI(R) is generated. An adaptive filter 40-3 is configured as follows. An impulse response corresponding to a transfer function between the speaker SP(R) and the microphone MC(L) is set in the adaptive filter 40-3. The adaptive filter convolutes the impulse response to the signal derived from the acoustic output terminal SO(R). As a result, the signal derived from the acoustic output terminal SO(R) is reproduced by the speaker SP(R), the reproduced signal is collected by the microphone MC(L), whereby an echo cancel signal EC3 for canceling the signal to be input to an acoustic input terminal SI(L) is generated. An adaptive filter 40-4 is configured as follows. An impulse response corresponding to a transfer function between the speaker SP(R) and the microphone MC(R) is set in the adaptive filter 40-4. The adaptive filter convolutes the impulse response to the signal derived from the acoustic output terminal SO(R). As a result, the signal derived from the acoustic output terminal SO(R) is reproduced by the speaker SP(R), the reproduced signal is collected by the microphone MC(R), whereby an echo cancel signal EC4 for canceling the signal to be input to an acoustic input terminal SI(R) is generated.

A subtracter 42-1 subtracts the echo cancel signals EC1 and EC3 from the signal collected by the microphone MC(L) and inputted in the acoustic input terminal SI(L) to there by perform the echo canceling. A subtracter 42-2 subtracts the echo cancel signals EC2 and EC4 from a signal collected by the microphone MC(R) and inputted in the acoustic input terminal SI(R) to there by perform the echo canceling. Those echo-canceled right and left channel signals are respectively output from lineout put terminals LO(R) and LO(L), and transmitted through the CODEC 18(22) and the transmission path 20 to the point of the opposite party.

A control unit 44 makes the function of the orthogonalizing filter 38 active or inactive (= turns on and off the orthogonalizing filter), and makes the adaptive operations of the adaptive filters 40-1 to 40-4 active or inactive (=turns on and off those adaptive filter). Specifically, the control unit detects error components (echo cancel estimation errors) contained in the signals output from the subtractors 42-1 and 42-2. When the detected error component is within a predetermined value, the control unit turns off the function of the orthogonalizing filter 38 so as to causes the stereo signals received at from the line input terminals LI(R) and LI(L) to straightforwardly pass through the orthogonalizing filter 38, and outputs those signals from the acoustic output terminals SO(L) and SO(R), whereby the stereo reproduction is realized. At the same time, the control unit turns off the adaptive operations of the adaptive filters 40-1 to 40-4 (fixes impulse responses to the values as set in the preceding adaptive operation). When the error component exceeds the predetermined value, the control unit turns on the function of the orthogonalizing filter 38, and the adaptive operations of the adaptive filters 40-1 to 40-4, thereby updating the impulse responses to be set to the adaptive filters 40-1 to 40-4. Upon completion of the operation of updating the impulse responses, the control unit turns off the function of the orthogonalizing filter 38 and the adaptive operations of the adaptive filters 40-1 to 40-4, and continues the off state of the filters until the error component exceeds the predetermined value again.

Figure 3:
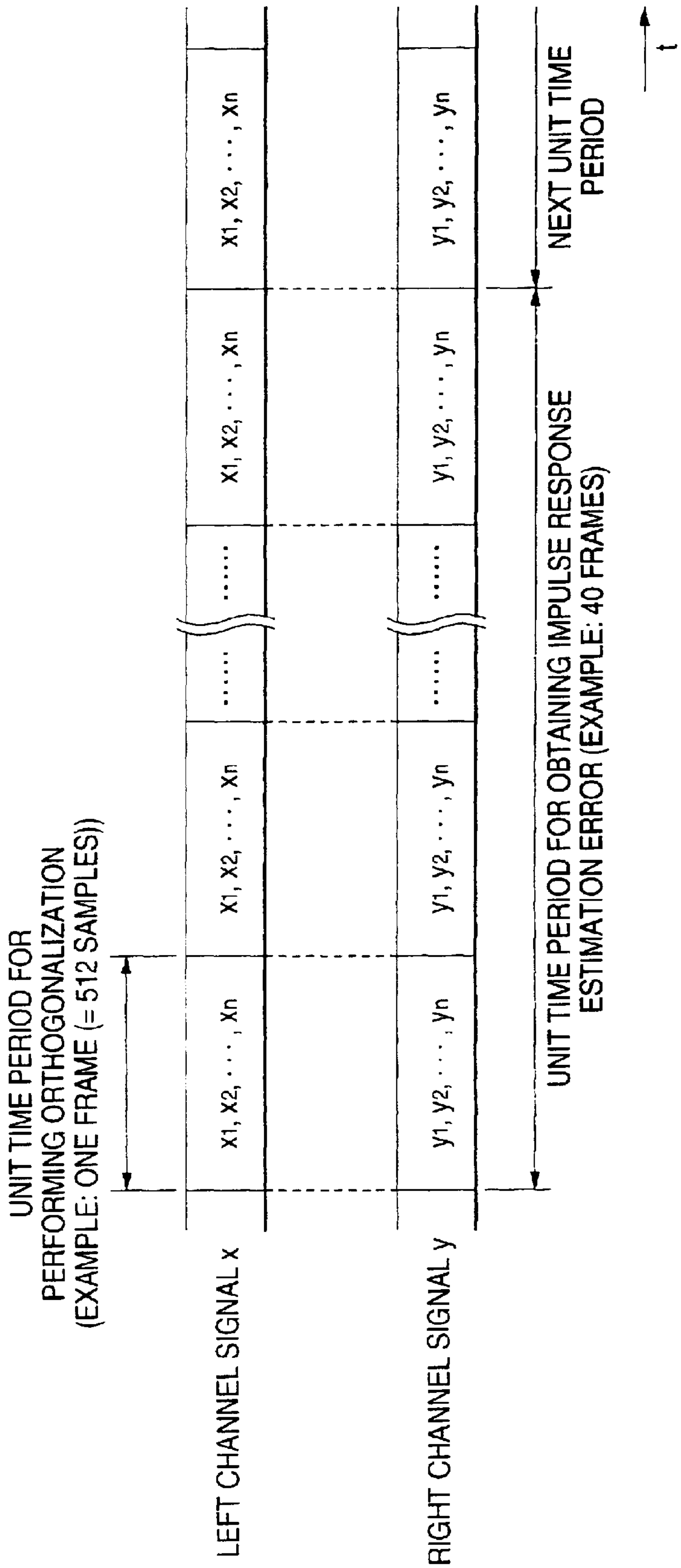
FIG. 3 is a time chart exemplarily showing a unit period during which an orthogonalizing process is carried out and an impulse response estimation error is obtained.

An orthogonalization process by the orthogonalizing filter 38 will be described. The orthogonalization process is performed for every given period of time of the input stereo signals. In this instance, the orthogonalization process, as shown in FIG. 3, is carried out everyone frame (e.g., 512 samples) Sample groups x, y of the input signals of the right and left channels within one frame to be input to the orthogonalizing filter 38 are mathematically given by $$x=x_1, x_2, x_3, \ldots, X_n$$

$$y=y_1, y_2, y_3, \ldots, y_n \text{ (n=512, for example)}$$

The sample groups x, y are stereo signals, and are mutually correlated. In the orthogonalization process, the sample groups x, y are treated as variables, and those sample groups consisting of the combinations of the two variables are subjected to a principal component analysis for each frame, thereby obtaining eigenvectors of a first main component and a second main component, both being orthogonal to each other, and the samples consisting of the combinations of the two variables are projected to the eigenvectors of the first main component and the second main component.

Detail description will be given about the operations of the orthogonalization process. Assuming that a observation matrix B is given by $$B=\begin{pmatrix} x_1, x_2, x_3, \cdots, x_n \\ y_1, y_2, y_3, \cdots, y_n \end{pmatrix} \qquad \text{(Formula 1)}$$

then, a covariance matrix S of the B is given by $$\begin{aligned} S &= \frac{1}{n-1}BB^T \ (B^T\text{: transposed matrix of B}) \qquad \text{(Formula 2)} \\ &= \frac{1}{n-1}\begin{pmatrix} x_1, x_2, x_3, \cdots, x_n \\ y_1, y_2, y_3, \cdots, y_n \end{pmatrix}\begin{pmatrix} x_1 & y_1 \\ x_2 & y_2 \\ \vdots & \vdots \\ x_1 & y_2 \end{pmatrix} \\ &= \frac{1}{n-1}\begin{pmatrix} \sum x_n^2 & \sum x_n y_n \\ \sum x_n y_n & \sum y_n^2 \end{pmatrix} \\ &= \begin{pmatrix} S_{11} & S_{12} \\ S_{21} & S_{22} \end{pmatrix} \end{aligned}$$

($S_{11}$: variance of x, $S_{22}$: variance of y, $S_{12}$ (=$S_{21}$): covariance of x, y)

The eigenvalue λ is given by $$\begin{vmatrix} S_{11}-\lambda & S_{12} \\ S_{21} & S_{22}-\lambda \end{vmatrix} = 0 \qquad \text{(Formula 3)}$$

Then, we have $$(S_{11}-\lambda)(S_{22}-\lambda)-S_{12}S_{21}=0 \qquad \text{(Formula 4)}$$

Solving the above equation for λ, then we have $$\lambda = \frac{S_{11} + S_{22} \pm \sqrt{(S_{11} + S_{22})^2 - 4(S_{11}S_{22} - S_{12}^2)}}{2} \quad \text{(Formula 5)}$$

The above equation has two solutions.

Of the two eigen values, the eigen value whose variance is larger than that of the other (eigen value of the first main component) is denoted by λ1. Then, the eigenvector Umax corresponding to the eigen value λ1 is expressed by [Formula 7] which allows (Formula 6) to hold $$\begin{pmatrix} S_{11} & S_{12} \\ S_{21} & S_{22} \end{pmatrix}\begin{pmatrix} a_1 \\ a_2 \end{pmatrix} = \lambda_1\begin{pmatrix} a_1 \\ a_2 \end{pmatrix} \quad \text{(Formula 6)}$$

$$\begin{pmatrix} a_1 \\ a_2 \end{pmatrix} \quad \text{(Formula 7)}$$

From the above relations, a1 and a2 can be written as $$a_1 = \pm\frac{S_{12}}{\sqrt{S_{12}^2 - (\lambda_1 - S_{11})^2}} \quad \text{(Formula 8)}$$

$$a_2 = \pm\frac{\lambda_1 - S_{11}}{\sqrt{S_{12}^2 - (\lambda_1 - S_{11})^2}}$$

The first main component represents the same axis irrespective of whether the sign of the solutions of a1 and a2 is "+" or "−".

Of the two eigen values, the eigen value whose variance is smaller than that of the other (eigen value of the second main component) is denoted by λ2. Then, the eigenvector Umin corresponding to the eigen value λ2 is expressed by (Formula 10) which allows (Formula 9) to hold $$\begin{pmatrix} S_{11} & S_{12} \\ S_{21} & S_{22} \end{pmatrix}\begin{pmatrix} a_1' \\ a_2' \end{pmatrix} = \lambda_2\begin{pmatrix} a_1' \\ a_2' \end{pmatrix} \quad \text{(Formula 9)}$$

$$\begin{pmatrix} a_1' \\ a_2' \end{pmatrix} \quad \text{(Formula 10)}$$

From the above relations, a1 and a2 can be written as $$a_1' = \pm\frac{S_{12}}{\sqrt{S_{12}^2 - (\lambda_2 - S_{11})^2}} \quad \text{(Formula 11)}$$

$$a_2' = \pm\frac{\lambda_2 - S_{11}}{\sqrt{S_{12}^2 - (\lambda_2 - S_{11})^2}}$$

The second main component represents the same axis irrespective of whether the sign of the solutions of a1 and a2 is "+" or "−".

A column vector of the observation matrix B, given by (Formula 13) is projected to the eigenvectors of the first and second main components thus obtained, given by (formula 12)

$$\vec{U}_{\max} = \begin{pmatrix} a_1 \\ a_2 \end{pmatrix}, \quad \vec{U}_{\min} = \begin{pmatrix} a_1' \\ a_2' \end{pmatrix} \quad \text{(Formula 12)}$$

-continued $$\vec{b} = \begin{pmatrix} x_n \\ y_n \end{pmatrix} \quad \text{(Formula 13)}$$

A value of an output signal "c" produced when the observation matrix B is projected to the eigenvector Umax is given by $$c = \vec{b} \cdot \vec{U}_{max} (\cdot\text{=inner product})\text{tm (formula 14)}$$

A value of an output signal "c'" produced when the observation matrix B is projected to the eigenvector Umin is given by $$c' = \vec{b} \cdot \vec{U}_{mn} (\text{=inner product}) \quad \text{(Formula 15)}$$

Figure 4:
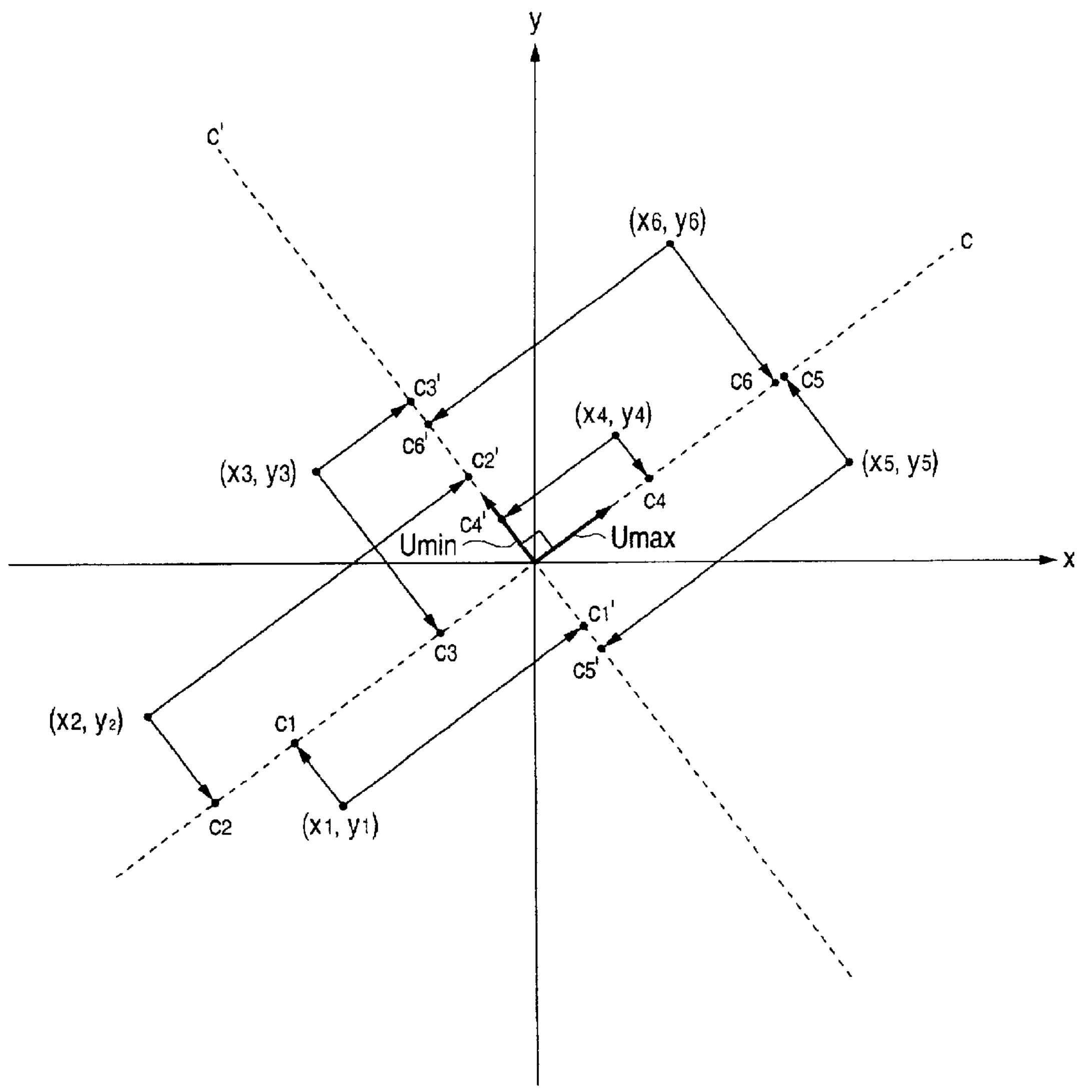
FIG. 4 is an explanatory diagram useful in explaining the projection of the FIG. 1 orthogonalizing filter.
Figure 5:
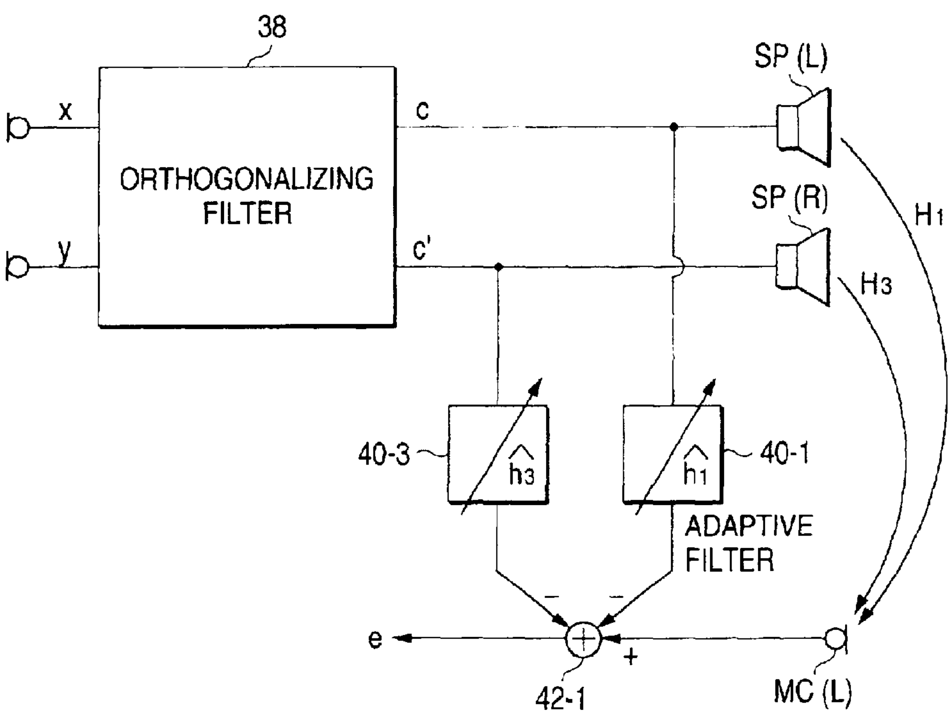
FIG. 5 is a diagram useful in explaining a filter characteristic to be set in an adaptive echo canceller in the FIG. 1 stereo echo canceller.

FIG. 4 illustrates this projection in model form. Since the eigenvectors Umax and Umin are orthogonal to each other, the two output signals "c" and "c" as projected are also orthogonal to each other. In this way, the sample groups x, y of the input signals of the right and left channels are converted into two signals "c" and "c'", which are orthogonal to each other (viz., mutually non-correlated). This process is repeatedly carried out for each frame.

The setting of the filter characteristics (impulse responses) in the adaptive filters 40-1 to 40-4, which is carried out based on the two signals "c" and "c'" thus converted, will be described. The setting of the filter characteristics in the adaptive filters 40-1 to 40-4 are carried out for each adaptive filter. The setting of the filter characteristics to the adaptive filters 40-1 and 40-3 will typically be described. In this instance, the two signals "c" and "c'" formed through the principal component analysis are given by $$c = c_1, c_2, c_3, \ldots, c_n$$

$$c' = c'_1, c'_2, c'_3, \ldots, c'_n$$

Assuming that the transfer functions between the speakers SP(L) and the microphones MC(L) are H1 and H3, the impulse responses corresponding to those transfer functions are h1 and h3, and the impulse responses of the adaptive filters 40-1 and 40-3 are given by $$\hat{h}_1, \hat{h}_3 \quad \text{(Formula 16)}$$

then, an echo cancel estimation error "e" of the output signal of the subtracter 42-1 is given by $$e = ch_1 - c\hat{h}_1 + c'h_3 - c'\hat{h}_3 \quad \text{(Formula 17)}$$

If the following relation holds, $$h_1 - \hat{h}_1 = \Delta h_1$$

$$h_3 - \hat{h}_3 = \Delta h_3 \quad \text{(Formula 18)}$$

(at the operation start, the impulse response is not set, and hence $\Delta h_1 = h_1$, $\Delta h_3 = h_3$.) then, we have $$e = c\Delta h_1 + c\ \Delta h_3 \quad \text{(Formula 19)}$$

When short time Fourier transform on this is performed, an echo cancel estimation error E (in the symbols representing variables, a small character indicates a time axis expression, and a large character indicates a frequency axis expression), is given by the following expression $$E = C\Delta H_1 + C'\Delta H_3 \quad \text{(Formula 20)}$$

The cross spectra between the error component E and the input signals C are calculated (viz., both sides of the equation is multiplied by a complex conjugate C* of the input signal C), and ensemble average of the value of the calculated cross spectra for a predetermined period of time (e.g., 40 frames as shown in FIG. 3) is calculated. Then, we have $$\Sigma C^*E=\Sigma|C|^2\Delta H_1 \quad \text{(Formula 21)}$$

Rearranging the equation for $\Delta H_1$, then we have $$\Delta H_1=\frac{\sum C^*E}{\sum|C|^2} \quad \text{(Formula 22)}$$

Since Δh1 produced by performing inverse Fourier transform on ΔH1 is an impulse response estimation error, the impulse response of the adaptive filter 40-1 is updated to $$\hat{h}_1+\Delta h_1 \quad \text{(Formula 23)}$$

The cross spectra between the error component E and the input signals C' are likewise calculated (viz., both sides of the equation is multiplied by a complex conjugate C'* of the input signal C'), and ensemble average of the calculated cross spectrum for a predetermined period of time (e.g., 40 frames as in the case of the input signal C) is calculated. Then, we have $$\Sigma C'^*E=\Sigma|C'|^2\Delta H_3 \quad \text{(Formula 24)}$$

Rearranging the equation for ΔH3, then we have $$\Delta H_3=\frac{\sum C'^*E}{\sum|C'|^2} \quad \text{(Formula 25)}$$

Since $\Delta h_3$ produced by performing inverse Fourier transform on $\Delta H_3$ is an impulse response estimation error, the impulse response of the adaptive filter 40-3 is updated to $$\hat{h}_3+\Delta h_3 \quad \text{(Formula 26)}$$

While the setting of the characteristics to the adaptive filters 40-1 and 40-3 has been described, the same thing is true for the setting of the characteristics to the adaptive filters 40-2 and 40-4.

In this embodiment, calculation of the impulse error estimation error is performed by respective adaptive filters 40-1 to 40-2. However, the calculation of the impulse response estimation error may be performed by an operation portion (not shown) provided in the stereo echo canceller.

Figure 6:
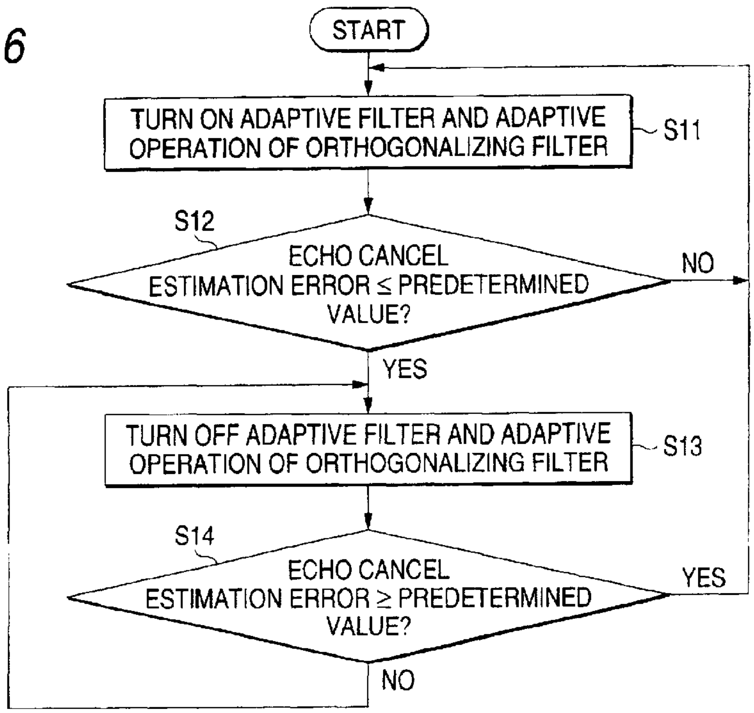
FIG. 6 is a flow chart showing a control by a control unit 44 in FIG. 1, which is for selecting an on or off of the function of an orthogonalizing filter 38, and a control by the same, which is for selecting an on or off of the adaptive operation of adaptive filters 40-1 to 40-4.
Figure 7:
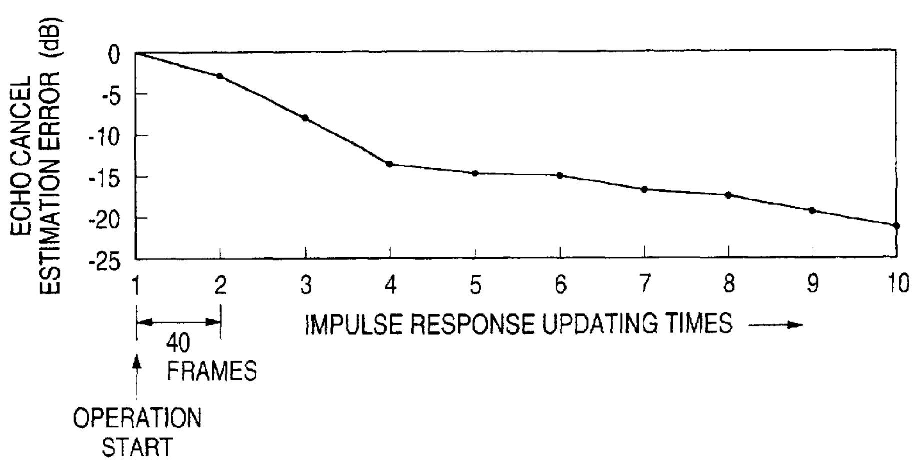
FIG. 7 is a graph showing a variation of echo canceling estimation error, which is charted from an instant that the FIG. 1 adaptive filter starts its operation.

How the control unit 44 controls the turning-on and off of the function of the orthogonalizing filter 38 and the adaptive operations of the adaptive filters 40-1 to 40-4 will be described with reference to FIG. 6. When the two-way stereo voice transmission device is started up, the operation of the orthogonalizing filter 38 and the adaptive operations of the adaptive filters 40-1 to 40-4 start (S11). In turn, the orthogonalizing filter 38 carries out an orthogonalization process of input stereo signals (x, y). The orthogonalized two signals (c, c') are reproduced from the speakers SP(L) and SP(R). The adaptive filters 40-1 to 40-4 calculate impulse response estimation errors Δh1 to Δh4 every predetermined period (e.g., 40 frames) on the basis of error components (echo cancel estimation errors) contained in the signals output from the subtracters 42-1 and 42-2, and update the filter characteristics (impulse responses) to such values as to cancel the impulse response estimation errors. FIG. 7 shows an operation of one adaptive filter in this case. As seen, the echo cancel estimation error is gradually decreased through the operation of updating the filter characteristic every time period of 40 frames, from a time point at which the filter operation starts (at this time, the impulse response is not yet set in the adaptive filter).

When the echo cancel estimation error decreases to below a predetermined value (S12), the control unit 44 stops the operation of the orthogonalizing filter 38 and the adaptive operations of the adaptive filters 40-1 to 40-4 (S13). That is, the orthogonalizing filter 38 straightforwardly outputs the input stereo signals (x, y) and the speakers SP(R) and SP(L) reproduce the signals. The control unit stops the operations of the adaptive filters 40-1 to 40-4, and the filter characteristics just before those are stopped are retained in the adaptive filters 40-l to 40-4. The control unit 44 measures an estimation error power even when the operation of the orthogonalizing filter 38 and the adaptive operations of the adaptive filters 40-1 to 40-4 are stopped. When the estimation error power of at least one of or two of or three of or whole of the adaptive filters is in excess of a predetermined value, the control unit starts again the operation of the orthogonalizing filter 38 and the adaptive operations of the adaptive filters 40-1 to 40-4 (S14), and repeats the sequence of operations mentioned above. In this way, a proper echo canceling state may be maintained.

Figure 8:
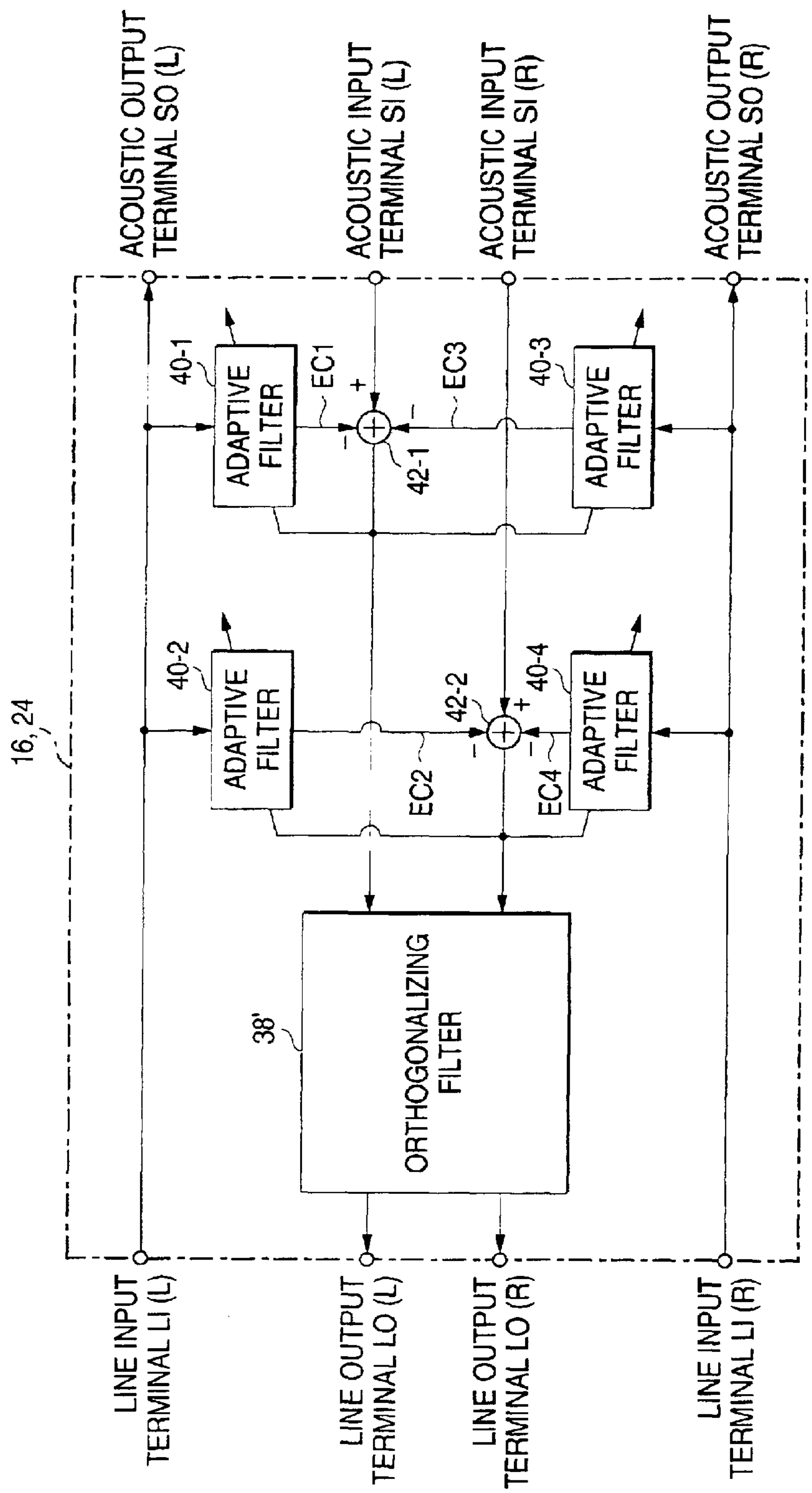
FIG. 8 is a block diagram showing another placing of the orthogonalizing filter in the stereo echo canceller.

In the embodiment mentioned above, the orthogonalizing filter 38 for performing the orthogonalization process of the voice signals collected by the microphones is located in the receiving side for receiving the collected voice signals. If required, it may be located in the transmission side as in FIG. 8 (in the figure, the orthogonalizing filter is designated by reference numeral 38'). It should be understood that the invention may be applied to the echo canceling process for various types of 2-channel signals being mutually correlated.

What is claimed is:

1. A method of setting impulse responses of first, second, third and fourth filters for echo canceling, the method comprising:

generating first and second echo cancel signals by convoluting a first impulse response of the first filter provided corresponding to a first microphone and a second impulse response of the second filter provided corresponding to a second microphone, respectively, to a first sound signal supplied to a first speaker;

generating third and fourth echo cancel signals by convoluting a third impulse response of the third filter provided corresponding to the first microphone and a fourth impulse response of the fourth filter provided to the second microphone, respectively, to a second sound signal supplied to a second speaker;

generating a first differential signal by subtracting the first and third echo cancel signals from a first collected signal collected by the first microphone;

generating a second differential signal by subtracting the second and fourth echo cancel signal from a second collected signal collected by the second microphone;

performing a principal component analysis on first and second correlation signals mutually correlated to convert the first correlation signal to a first orthogonal signal and convert the second correlation signal to a second orthogonal signal which is orthogonal to the first orthogonal signal;

reproducing the first orthogonal signal through the first speaker and reproducing the second orthogonal signal through the second speaker;

calculating a first cross spectrum between the first differential signal and the first orthogonal signal to be reproduced by the first speaker, calculating an estimation error of the first impulse response based on the first cross spectrum, and updating characteristics of the first impulse response so as to cancel the estimation error of the first impulse response;

calculating a third cross spectrum between the first differential signal and the second orthogonal signal to be reproduced by the second speaker, calculating an estimation error of the third impulse response based on the third cross spectrum, and updating characteristics of the third impulse response to cancel the estimation error of the third impulse response;

calculating a second cross spectrum between the second differential signal and the first orthogonal signal to be reproduced by the first speaker, calculating an estimation error of the second impulse response based on the second cross spectrum, and updating characteristics of the second impulse response to cancel the estimation error of the second impulse response;

calculating a fourth cross spectrum between the second differential signal and the second orthogonal signal to be reproduced by the second speaker, calculating an estimation error of the fourth impulse response based on the fourth cross spectrum, and updating characteristics of the fourth impulse response to cancel the estimation error of the fourth impulse response; and switching the first orthogonal signal to be reproduced by the first speaker to the first correlation signal and switching the second orthogonal signal to be reproduced by the second speaker to the second correlation signal after updating the characteristics of the first and fourth impulse responses.

2. The method according to claim 1, wherein the estimation error of the first, second, third and fourth impulse responses are calculated during the time that the first speaker reproduces the first correlation signal and the second speaker reproduces the second correlation signal.

3. The method according to claim 2 further comprising:

detecting whether the estimation error of at least one of the first, second, third and fourth filters reaches a predetermined value, wherein when the estimation error of the at least one of the first, second, third and fourth filters reaches the predetermined value, the first correlation signal to be reproduced by the first speaker is switched to the first orthogonal signal and the second correlation signal to be reproduced by the second speaker is switched to the second orthogonal signal, and the characteristics of the at least one of the first, second, third and fourth filters is updated.

4. A method of setting impulse responses of first, second, third and fourth filters for echo canceling when sound signals are bi-directionally transmitted between first and second points, wherein first and second speakers and first and second microphones are provided at the first point, and third and fourth speakers, third and fourth microphones, the first and third filters corresponding to the third microphone and the second and fourth filters corresponding to the fourth microphone are provided at the second point, the method comprising:

generating first and second echo cancel signals by convoluting a first impulse response of the first filter and a second impulse response of the second filter, respectively, to a first sound signal collected by the first microphone and supplied to the third speaker;

generating third and fourth echo cancel signals by convoluting a third impulse response of the third filter and a fourth impulse response of the fourth filter, respectively, to a second sound signal collected by the second microphone and supplied to the fourth speaker;

supplying to the first speaker a first differential signal obtained by subtracting the first and third echo cancel signals from a first collected signal collected by the third microphone;

supplying to the second speaker a second differential signal obtained by subtracting the second and fourth echo cancel signals from a second collected signal by the fourth microphone;

performing a principal component analysis on first and second correlation signals mutually correlated to convert the first correlation signal to a first orthogonal signal and convert the second correlation signal to a second orthogonal signal which is orthogonal to the first orthogonal signal;

reproducing the first orthogonal signal through the third speaker and reproducing the second orthogonal signal through the fourth speaker;

calculating a first cross spectrum between the first differential signal and the first orthogonal signal to be produced by the third speaker, calculating an estimation error of the first impulse response based on the first cross spectrum, and updating characteristics of the first impulse response so as to cancel the estimation error of the first impulse response;

calculating a third cross spectrum between the first differential signal and the second orthogonal signal to be produced by the fourth speaker, calculating an estimation error of the third impulse response based on the third cross spectrum, and updating characteristics of the third impulse response so as to cancel the estimation error of the third impulse response;

calculating a second cross spectrum between the second differential signal and the first orthogonal signal to be produced by the third speaker, calculating an estimation error of the second impulse response based on the second cross spectrum, and updating characteristics of the second impulse response so as to cancel the estimation error of the second impulse response;

calculating a fourth cross spectrum between the second differential signal and the second orthogonal signal to be produced by the fourth speaker, calculating an estimation error of the fourth impulse response based on the fourth cross spectrum, and updating characteristics of the fourth impulse response so as to cancel the estimation error of the fourth impulse response; and switching the first orthogonal signal to be reproduced by the third speaker to the first correlation signal and switching the second orthogonal signal to be reproduced by the fourth speaker to the second correlation signal after updating the characteristics of the first and fourth impulse responses.

5. The method according to claim 4, wherein the estimation error of the first, second, third and fourth impulse responses are calculated during the time that the first speaker reproduces the first correlation signal and the second speaker reproduces the second correlation signal.

6. The method according to claim 5 further comprising:

detecting whether the estimation error of at least one of the first, second, third and fourth filters reaches a predetermined value, wherein when the estimation error of the at least one of the first, second, third and fourth filters reaches the predetermined value, the first correlation signal to be reproduced by the third speaker is switched to the first orthogonal signal and the second correlation signal to be reproduced by the fourth speaker is switched to the second orthogonal signal, and the characteristics of the at least one of the first, second, third and fourth filters is updated.

7. An echo canceller for performing an echo canceling operation in an acoustic system in which first and second speakers and first and second microphones are disposed in a same space, the echo canceller comprising:

a first filter, for generating a first echo cancel signal by convoluting a first impulse response to a first sound signal supplied to the first speaker, provided corresponding to the first microphone;

a second filter, for generating a second echo cancel signal by convoluting a second impulse response to the first sound signal, provided corresponding to the second microphone;

a third filter, for generating a third echo cancel signal by convoluting a third impulse response to a second sound signal supplied to the second speaker, provided corresponding to the first microphone;

a fourth filter, for generating a fourth echo cancel signal by convoluting a fourth impulse response to the second sound signal, provided corresponding to the first microphone;

a first subtracter for generating a first differential signal obtained by subtracting the first and third echo cancel signals from a first collected sound signal collected by the first microphone;

a second subtracter for generating a second differential signal obtained by subtracting the second and fourth echo cancel signals from a second collected sound signal collected by the second microphone;

an orthogonalizing unit for performing a principal component analysis on first and second correlation signals mutually correlated to convert the first correlation signal to a first orthogonal signal and convert the second correlation signal to a second orthogonal signal which is orthogonal to the first orthogonal signal, the first orthogonal signal being reproduced through the first speaker and the second orthogonal signal being reproduced through the second speaker; and a switching unit, for switching the first orthogonal signal to be reproduced by the first speaker to the first correlation signal and switching the second orthogonal signal to be reproduced by the second speaker to the second correlation signal after updating the characteristics of the first and fourth impulse responses, wherein the first filter calculates a first cross spectrum between the first differential signal and the first orthogonal signal to be reproduced by the first speaker, calculates an estimation error of the first impulse response based on the first cross spectrum, and updates characteristics of the first impulse response so as to cancel the estimation error of the first impulse response, the third filter calculates a third cross spectrum between the first differential signal and the second orthogonal signal to be reproduced by the second speaker, calculates an estimation error of the third impulse response based on the third cross spectrum, and updates characteristics of the third impulse response to cancel the estimation error of the third impulse response, the second filter calculates a second cross spectrum between the second differential signal and the first orthogonal signal to be reproduced by the first speaker, calculates an estimation error of the second impulse response based on the second cross spectrum, and updates characteristics of the second impulse response to cancel the estimation error of the second impulse response, and the fourth filter calculates a fourth cross spectrum between the second differential signal and the second orthogonal signal to be reproduced by the second speaker, calculates an estimation error of the fourth impulse response based on the fourth cross spectrum, and updates characteristics of the fourth impulse response to cancel the estimation error of the fourth impulse response.

8. An echo canceller, wherein when the sound signals are bi-directionally transmitted between a first point on which first and second speakers and first and second microphone are disposed and a second point on which third and fourth speakers and third and fourth microphones are disposed, the echo canceller is used in the second point, the echo canceller comprising:

a first filter, for generating a first echo cancel signal by convoluting a first impulse response to a first sound signal collected by the first microphone and supplied to the third speaker, provided corresponding to the third microphone;

a second filter, for generating a second echo cancel signal by convoluting a second impulse response to the first sound signal, provided corresponding to the fourth microphone;

a third filter, for generating a third echo cancel signal by convoluting a third impulse response to a second sound signal collected by the second microphone and supplied to the fourth speaker, provided corresponding to the third microphone;

a fourth filter, for generating a fourth echo cancel signal by convoluting a fourth impulse response of the fourth filter to the second sound signal, provided corresponding to the fourth microphone;

a first subtracter for generating a first differential signal obtained by subtracting the first and third echo cancel signals from a first collected signal collected by the third microphone;

a second subtracter for generating a second differential signal obtained by subtracting the second and fourth echo cancel signals from a second collected signal by the fourth microphone;

an orthogonalizing unit for performing a principal component analysis on a first and second correlation signals mutually correlated to convert the first correlation signal to a first orthogonal signal and convert the second correlation signal to a second orthogonal signal which is orthogonal to the first orthogonal signal, the first orthogonal signal being reproduced through the third speaker and the second orthogonal signal being reproduced through the fourth speaker; and a switching unit for switching the first orthogonal signal to be reproduced by the third speaker to the first correlation signal and switching the second orthogonal signal to be reproduced by the fourth speaker to the second correlation signal after updating the characteristics of the first and fourth impulse responses, wherein the first filter calculates a first cross spectrum of the first differential signal and the first orthogonal signal to be produced by the third speaker, calculates an estimation error of the first impulse response based on the first cross spectrum, and updates characteristics of the first impulse response so as to cancel the estimation error of the first impulse response, the third filter calculates a third cross spectrum between the first differential signal and the second orthogonal signal to be produced by the fourth speaker, calculates an estimation error of the third impulse response based on the third cross spectrum, and updates characteristics of the third impulse response so as to cancel the estimation error of the third impulse response, the second filter calculates a second cross spectrum between the second differential signal and the first orthogonal signal to be produced by the third speaker, calculates an estimation error of the second impulse response based on the second cross spectrum, and updates characteristics of the second impulse response so as to cancel the estimation error of the second impulse response, and the fourth filter calculates a fourth cross spectrum between the second differential signal and the second orthogonal signal to be produced by the fourth speaker, calculates an estimation error of the fourth impulse response based on the fourth cross spectrum, and updates characteristics of the fourth impulse response so as to cancel the estimation error of the fourth impulse response.

9. An echo canceller, wherein when the sound signals are bi-directionally transmitted between a first point on which first and second speakers and first and second microphone are disposed and a second point on which third and fourth speakers and third and fourth microphones are disposed, the echo canceller is used in the second point, the echo canceller comprising:

a first filter, for generating a first echo cancel signal by convoluting a first impulse response to a first sound signal collected by the first microphone and supplied to the third speaker, provided corresponding to the third microphone;

a second filter, for generating a second echo cancel signal by convoluting a second impulse response to the first sound signal, provided corresponding to the fourth microphone;

a third filter, for generating a third echo cancel signal by convoluting a third impulse response to a second sound signal collected by the second microphone and supplied to the fourth speaker, provided corresponding to the third microphone;

a fourth filter, for generating a fourth echo cancel signal by convoluting a fourth impulse response of the fourth filter to the second sound signal, provided corresponding to the fourth microphone;

a first subtracter for generating a first differential signal obtained by subtracting the first and third echo cancel signals from a first collected signal collected by the third microphone;

a second subtracter for generating a second differential signal obtained by subtracting the second and fourth echo cancel signals from a second collected signal by the fourth microphone;

a receiving unit for receiving first and second orthogonal signals which are orthogonal each other, the first orthogonal signal being reproduced through the third speaker and the second orthogonal signal being reproduced through the fourth speaker, wherein the first orthogonal signal is converted from a first correlation signal by performing a principal component analysis on the first correlation signal, the second orthogonal signal is converted from a second correlation signal correlated to the first correlation signal by performing a principal component analysis on the second correlation signal; and a switching unit for switching the first orthogonal signal to be reproduced by the third speaker to the first correlation signal and switching the second orthogonal signal to be reproduced by the fourth speaker to the second correlation signal after updating the characteristics of the first and fourth impulse responses, wherein the first filter calculates a first cross spectrum between the first differential signal and the first orthogonal signal to be produced by the third speaker, calculates an estimation error of the first impulse response based on the first cross spectrum, and updates characteristics of the first impulse response so as to cancel the estimation error of the first impulse response, the third filter calculates a third cross spectrum between the first differential signal and the second orthogonal signal to be produced by the fourth speaker, calculates an estimation error of the third impulse response based on the third cross spectrum, and updates characteristics of the third impulse response so as to cancel the estimation error of the third impulse response, the second filter calculates a second cross spectrum between the second differential signal and the first orthogonal signal to be produced by the third speaker, calculates an estimation error of the second impulse response based on the second cross spectrum, and updates characteristics of the second impulse response so as to cancel the estimation error of the second impulse response, and the fourth filter calculates a fourth cross spectrum between the second differential signal and the second orthogonal signal to be produced by the fourth speaker, calculates an estimation error of the fourth impulse response based on the fourth cross spectrum, and updates characteristics of the fourth impulse response so as to cancel the estimation error of the fourth impulse response.

10. An echo canceller for canceling an echo of a collected sound signal collected by a microphone comprising:

a filter unit for generating an echo cancel signal by convoluting an impulse response to an inputted sound signal;

a conversion unit for converting two correlation signals correlated with each other to two orthogonal signals which are orthogonal to each other by performing a principal component analysis on the correlation signals;

a subtracting unit for outputting a differential signal obtained by subtracting the echo cancel signal from the collected sound signal; and a switching unit for switching signals to be reproduced by speakers from the orthogonal signals to the correlation signals after updating the characteristics of the impulse response, wherein the filter updates characteristics of the impulse response to cancel an estimation error of the impulse response calculated based on the differential signal and one of the orthogonal signals.

11. The echo canceller according to claim 10, wherein the estimation error is calculated by the filter unit.

12. The echo canceller according to claim 10, wherein the estimation error is calculated by an operation portion provided in the stereo echo canceller.

13. A method of canceling an echo of a collected sound signal collected by a microphone comprising:

generating an echo cancel signal by convoluting an impulse response to an inputted sound signal;

performing a principal component analysis on two correlation signals correlated with each other to convert the correlation signals to two orthogonal signals which are orthogonal to each other;

subtracting the echo cancel signal from the collected sound signal to obtain a differential signal;

outputting the differential signal;

calculating an estimation error based on the differential signal and one of the two orthogonal signals;

updating characteristics of the impulse response to cancel the calculated estimation error; and switching signals to be reproduced by speakers from the orthogonal signals to the correlation signals.

* * * * *